(12) United States Patent
Ruckert

(10) Patent No.: US 10,397,148 B2
(45) Date of Patent: Aug. 27, 2019

(54) SYSTEM FOR PROCESSING ELECTRONIC MESSAGES

(71) Applicant: Tobias Ruckert, Winterbach (DE)

(72) Inventor: Tobias Ruckert, Winterbach (DE)

( * ) Notice: Subject to any disclaimer, the term of this patent is extended or adjusted under 35 U.S.C. 154(b) by 280 days.

(21) Appl. No.: 15/424,857

(22) Filed: Feb. 5, 2017

(65) Prior Publication Data

US 2017/0149702 A1  May 25, 2017

Related U.S. Application Data

(63) Continuation-in-part of application No. PCT/EP2015/025052, filed on Jul. 18, 2015.

(30) Foreign Application Priority Data

Aug. 19, 2014  (DE) .................. 10 2014 012 255

(51) Int. Cl.
*H04L 12/58* (2006.01)
*H04L 29/08* (2006.01)

(52) U.S. Cl.
CPC .............. *H04L 51/04* (2013.01); *H04L 51/10* (2013.01); *H04L 51/36* (2013.01); *H04L 67/10* (2013.01); *H04L 51/32* (2013.01)

(58) Field of Classification Search
CPC ...................................................... H04L 51/04
USPC ......................................................... 709/206
See application file for complete search history.

(56) References Cited

U.S. PATENT DOCUMENTS 8,583,743 B1   11/2013  Gailloux et al.
2008/0215694 A1  9/2008  Chen et al.

FOREIGN PATENT DOCUMENTS

DE   10 2011 117 777 B3   1/2013
DE   10 2012 005 230 A1   9/2013

OTHER PUBLICATIONS

Gordon, "Understanding OAuth: What Happens When You Log Into a Site with Google, Twitter, or Facebook", Jun. 13, 2012, lifehacker.com (5 pages).*
R. Gellens, QUALCOMM, Mapping Between the Multimedia Messaging Service (MMS) and Internet Mail; draft-ietf-lemonade-mmms-mapping-06.txt, Oct. 1, 2005, vol. lemonade, No. 6, Oct. 1, 2005, XP01541072, ISSN: 0000-0004, the whole document (34 pages).
International Search Report for corresponding international application No. PCT/EP2015/025052 dated Oct. 8, 2015, by Erik Fischer (3 pages).

* cited by examiner

*Primary Examiner* — Wing F Chan
*Assistant Examiner* — Leon Y Tseng
(74) *Attorney, Agent, or Firm* — Ronald S. Lombard

(57) ABSTRACT

A system for processing electronic messages, whereby a user can transmit and receive various types of electronic messages via one processing module only. The different types of electronic messages can contain various attributes, such as "read" and "unread", although not all types of messages need to have the same attributes. In order to make the handling of attributes in electronic messages easy, it is provided that the system contains allocation tables between various attribute sets of the electronic messages.

8 Claims, 1 Drawing Sheet

SYSTEM FOR PROCESSING ELECTRONIC MESSAGES

CROSS-REFERENCE TO RELATED APPLICATION

This is a continuation-in-part application of pending international application PCT/EP2015/025052 filed Jul. 18, 2015 and claiming the priority of German Application No. 10 2014 012 255.7 filed Aug. 19, 2014. The aforesaid pending international application PCT/EP2015/025052 and German Application No. 10 2014 012 255.7 are both incorporated herein by reference as though fully set forth.

BACKGROUND OF THE INVENTION

The invention concerns a system for processing electronic messages with the features of the claims.

The number and especially the types of electronic messages, such as in the form of e-mails, short messages (SMS) or messages in a social network, are constantly increasing. There are known ways for virtually every type of electronic message to process them, especially in the form of programs for computers or mobile phones, to name just two examples. If a user wishes to transmit and receive many types of electronic messages, he or she must usually use a number of different devices and/or programs.

Electronic messages can basically be sub-divided into so-called directional and non-directional messages. E-mails, SMS, telephone calls or other forms of communication count among the directional messages, since they are addressed to one or several specific receivers (addressees). However, many people nowadays use non-directional messages for exchanging information or for interactive communication. Non-directional communication with non-directional messages requires that the users transmit their communication to third parties, but not to a certain receiver or organization. Non-directional communication is transmitted and received via the social media and the social networks, i.e. Websites, networks or other communication systems. Social media include blogs, micro-blogs, RSS subscriptions, Websites of social media (such as LinkedIn®, Xing, Facebook®, Twitter®, Weibo®, Pinterest® and YouTube®) as well as other types of social media, both comment hosting services/moderation systems (such as Disqus®) and the group communication via e-mail groups, such as Google® Groups, or chat lists as run by Whatsapp® or WeChat®.

Therefore, systems for processing electronic messages exist already, where a person (user) can transmit and receive different types of electronic messages via a single processing module only. As an example, such kind of system is described in German patent DE 102011117777 B3.

Apart from the actual message text and any attachments, such as files or images, electronic messages may also possess so-called attributes that specify the electronic messages in detail. Such kind of attributes can either be "unread" or "read". However, not all types of electronic messages possess the same attributes, i.e. possible attributes rather differ from type to type of electronic message. As an example, there can be a "like" message in a social network which would not make sense in an e-mail.

The invention therefore intends to propose such kind of system for processing electronic messages that makes the handling of attributes in electronic messages easy, which will be ensured by a system of features as represented by the claims.

SUMMARY OF THE INVENTION

The system for processing electronic messages according to the invention features a first interface module, a second interface module, a processing module and a conversion module. The first interface module is used for transmitting and receiving a first type of electronic messages via a first communication channel. The electronic messages of the first type can have attributes of a first attribute set. The second interface module is used for transmitting and receiving a second type of electronic messages via a second communication channel. The electronic messages of the second type can have attributes of a second attribute set. A person editing electronic messages (user) can process a standard message type with the help of a processing module and, in doing so, allocate attributes of a standard attribute set to the electronic messages concerned. The conversion module will now make it possible to convert electronic messages into the first and second messages type and vice versa. A first allocation table between the standard attribute set and the first attribute set is filed, as a minimum, in the first interface module, a second allocation table between the standard attribute set and the second attribute set is filed, as a minimum, in the second interface module. The first interface module is designed in such a way that it converts attributes between the first attribute set and the standard attribute set on the basis of the first allocation table, while the second interface module is designed in such a way that it converts attributes between the second attribute set and the standard attribute set on the basis of the second allocation table. The conversion is bidirectional in each case.

This will make it possible that the user can modify attributes of different types of electronic messages with the help of the processing module and that he or she need not use a separate program for each kind of electronic messages. This will make the processing of different types of electronic messages particularly easy and efficient.

Moreover, the system of this invention possesses further interface modules for transmitting and receiving other message types via further communication channels.

The system of this invention has been specifically designed in such a way that it is suitable for processing directional and non-directional electronic messages. The electronic message can be an e-mail, an SMS, a message in a social network, such as Facebook® or LinkedIn®, a message in a short message service, such as Twitter®, in a so-called Instant Messaging System, such as Skype®, or an "Over-the-Top" audio and video transmission in the Internet, to name but a few examples. Further examples of an electronic message are an entry in a freely accessible online forum or in an online forum with restricted access, such as a corporate network. It may also be possible that an electronic message is generated by converting a hard-copy letter or a voice message accordingly. The editor can also (pre-)set the behavior of the different communication channels and configure them. The transmission of the information necessary for this action is also considered to be an electronic message. "Behavior" in that sense means that the system will recognize unwanted electronic messages and mark them accordingly.

Attributes of the electronic messages can be among others: "read", "unread", "important", "very important", "private", "job-related", "confidential", "official/public", "like", "share", "white list", "black list".

Processing an electronic message is meant to be especially reading and transmitting such message, but also setting and removing attributes. In order to process an electronic message, it can be downloaded from one of the interface modules referred to above, stored in the system for processing such electronic messages and modified accordingly. It is also possible, though, to leave the electronic message on an external server, so that the interface module will call for the contents necessary for the processing and passes them on to the processing module without storing them in the system for processing electronic messages. In this case, the attributes of the electronic messages can be modified on the external server.

In embodying the invention rules concerning the above conversion process have been set up and stored in the first and/or second allocation table. This will ensure that the conversion between the first and/or second attribute set and the standard attribute set becomes particularly easy and effective; complex conditions can be represented at the same time. The simplest rule in this context is a 1:1 allocation between an attribute of the first or second attribute set and an attribute of the standard attribute set. As an example, all attribute sets may contain the attribute "read" which has the same meaning in all attribute sets. However, the rules may also combine several attributes in logical links: It may well be defined and stored in the allocation table that an attribute 1A1 of the first attribute set is set, when the attributes SA1 and SA2 of the standard attribute set are set at the same time. This rule has then executed the logical AND link. Other logical links, such as an OR link, an exclusive OR link or combinations of logical links, are also possible. If a logical link is used as described above, two allocation tables are stored especially for the conversion between a certain attribute set, say, the first attribute set and the standard attribute set, namely an allocation table for the conversion from the standard attribute set into the first attribute set and a second allocation table for the allocation in the other direction.

In embodying the invention the processing module has been designed in such a way that it can be determined when transmitting an electronic message and from which interface module. This will make it possible to process electronic messages in a flexible manner. An electronic message can be transmitted either from one interface module and thus via one communication channel or, alternatively, from several interface modules at the same time. This pre-defined arrangement will be implemented in and by the interface module. Likewise, the user can also request the reception of electronic messages in the processing module via one or several interface modules. In such case, the interface module will also address the individual interface modules concerned.

In embodying the invention the processing module has been designed in such a way that a search for a certain electronic message can be started via more than one interface module. This makes the search for electronic messages particularly easy and independent from the type of electronic message. As has already been described, the electronic messages can be stored on external servers that have access to the various interface modules. Starting a search via more than one interface module, as described above, will make it possible to search for an electronic message in a place irrespective of its type and storage location. Moreover, it is also possible to extend the search to archives of electronic messages.

The processing module can also be designed in such a way that it can recognize messages related to each other, i.e. those concerning one and the same subject, across various communication channels. This will make it possible to determine the beginning and the end of a conversation. Such messages which are related to each other can be recognized by (the same) subject heading or by an assessment of the message content, to name but two examples. It will then be possible that a user can tell the system to display only messages about a certain subject.

In embodying the invention the conversion module has been designed in such a way that it can provide information for the user on request. A specific feature of the conversion module is that it is connected with several processing modules which are each allocated to their own user. These may even be some thousand individual users, and the information concerning these individual users, such as their receiving addresses for the various communication channels, are stored in the conversion module which can provide these receiving addresses on request. So, if a first user wishes to transmit an electronic message to a second user via a first communication channel and gets the feedback that the second user cannot be reached temporarily via this communication channel, the second user may start an inquiry on the conversion module for the second user's receiving addresses on other communication channels. If the conversion module knows further receiving addresses of the second user, it will pass on this information to the first user, who can then try to get hold of the second user on the basis of this information via another communication channel. The individual users can specifically determine, whether the conversion module is allowed passing on this information if requested to do so. But it is also possible that such kind of inquiries are transmitted via one of the interface modules to the conversion module and answered from there. In such case, the user making the inquiry need not be connected directly with the conversion module and need not use it for processing electronic messages. Here, a single user may also be allocated to one conversion module only.

In embodying the invention the conversion module has been designed in such a way that the login information required by the interface modules for transmitting and receiving electronic messages can be passed on. In order to enable the interface modules to communicate with the external servers allocated to them, so that they can transmit and receive electronic messages, the relevant server must be used for the login or authentication of the user. This login information usually consists of a combination of a login name and a password. It is also possible that the login information is stored in a specific data format which depends on the communication channel. The login information thus stored is often referred to as a so-called "access token", which the user can generate with the help of the system that represents the invention. If the conversion module can pass on the login information, it need not be stored in the conversion module, so that this information is especially protected against unauthorized access. This design of the conversion module can be implemented independently from the existence of the above conversion tables for the attributes of the electronic messages.

In embodying the invention the system for processing electronic messages is equipped with an identification module which can provide login information to the conversion module. Apart from the login information for the various communication channels, parts of the electronic messages or the entire message can be filed and stored in this identification module.

In embodying the invention the identification module has been developed in such a way that the conversion module and at least one interface module have been specifically designed, so that the login information can be transmitted encrypted from the identification module via the conversion module to the interface module. This is advantageous inasmuch as the login information is held in the conversion module in its encrypted form only, which makes any unauthorized access to the login information much more difficult.

In embodying the invention the identification module has been designed in such a way that it can read out the login information from an identification device. The latter can be designed as an identification card with readable information like a credit card. This will provide specific protection against any unauthorized access to a user's electronic messages. Apart from the above mentioned identification card, other types of identification devices, such as so-called dongles or tokens, are possible.

BRIEF DESCRIPTION OF THE DRAWINGS

The description of the invention and the drawing complementing it provide further details of the system. The examples of how the invention is designed have been simplified in the drawing and are explained in more detail below.

DETAILED DESCRIPTION OF THE PARTICULAR EMBODIMENTS

Figure 1:
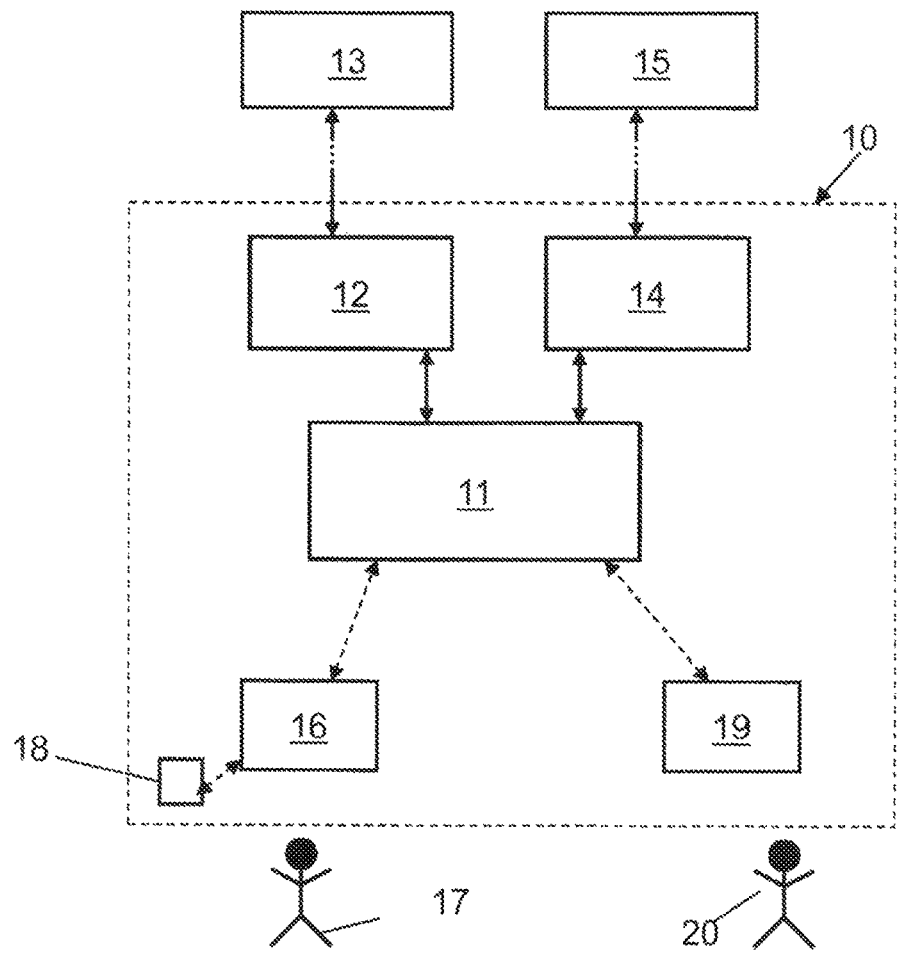
FIG. 1 is a schematic diagram of a system for processing electronic messages.

In accordance with FIG. 1, a system 10 for processing electronic messages features a conversion module 11 that is connected with a first interface module 12. The first interface module 12 is connected via the Internet with a first external server 13, from where it can receive a first type of electronic messages, say in the form of e-mails, and from which it can transmit this type of messages. The first interface module 12 and the first external server 13 thus represent a first communication channel. The conversion module 11 is also connected with a second interface module 14 which together with a second external server 15 represent a second communication channel. Messages in a social network can be transmitted and received via the second communication channel. Apart from these two communication channels, further communication channels in a similar configuration are possible. Each interface module can be installed on a server of its own, while several interface modules may also be jointly installed on one server.

Besides, the conversion module 11 is connected with a first processing module 16, on which a first user 17 can transmit and receive various types of electronic messages, so that they can also be processed there. In order to do so, the conversion module 11 converts an electronic message received on one of the interface modules 12 or 14 from the original first or second messages type into a standard messages type that can be processed by the processing module. When the user wishes to transmit an electronic message via one of the communication channels described above, he or she can draft a standard messages type with the help of the processing module 16. After the electronic message has been transmitted to the conversion module 11, the latter will convert the electronic message into the relevant first and/or second messages type and passes it subsequently on to the corresponding interface modules 12, 14, from where it will be passed on to the corresponding external servers 13, 15.

The first processing module 16 is additionally connected with an identification module in form of a card reader 18. The first user 17 can insert an identification card (not shown) into this card reader 18 that contains the login information, such as login name and password, for the various communication channels. When the user logs in at the system 10, this login information will be read by the card reader 18 and transmitted to the conversion module 11. This, in turn, will pass on the relevant login information to the various interface modules 12 & 14. The login information can be transmitted either encrypted or not encrypted. When being transmitted in the encrypted version, it can later be decrypted either in the corresponding communication module or, even later, on the corresponding external server. All of this can be determined by the user 17 via the processing module 16. It is also possible to decrypt the information in the corresponding interface modules 12 & 14. In this case, the interface modules 12 & 14 will be pro-grammed accordingly by the user, and no information would be available for decryption in the conversion module 11.

Apart from the first processing module 16, the system 10 possesses a second processing module 19, with the help of which a second user 20 can process electronic messages. Apart from the two processing modules 16 & 19 as well as the users 17 & 20 as referred to above, numerous other processing modules and users are possible.

The received and transmitted electronic messages contain attributes, such as "read", "unread", "important", "very important", "private", "job-related", "confidential", "official/public", "like", "share" etc., although not all types of electronic messages may have the same attributes. It is for this reason that a standard attribute set is filed in the conversion module 11 which contains all attributes that are supported by the conversion module 11 and thus by the processing modules 16 & 19 as well. The users 17 & 20 can allocate attributes of the standard attribute set to the individual electronic messages via the processing modules 16 & 19. In doing so, the attributes, such as "read", will also be automatically allocated by the processing modules 16 & 19.

First and second allocation tables are filed in the corresponding first and second interface modules 12 & 14 for the conversion of the attributes of the standard attribute set of the electronic message in the standard messages type into attributes of the first or second attribute set of the electronic message in the first or second message type. The interface modules 12 & 14 can convert the attributes between the first or second attribute set and the standard attribute set on the basis of these allocation tables.

Figure 2:
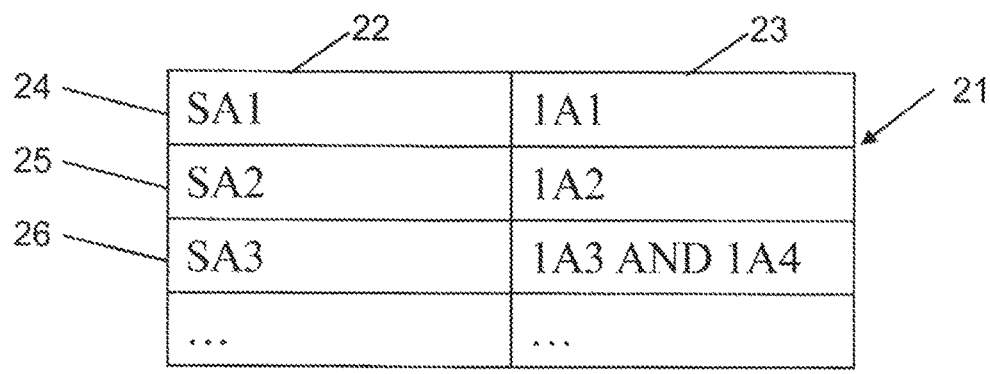
FIG. 2 is an extract from an allocation table between a first attribute set and a standard attribute set.

FIG. 2 shows an extract of such conversion table 21 of the first interface module 12. The first column 22 of the conversion table 21 contains all attributes of the standard attribute set. The allocated attributes of the first attribute set can be found in the relevant line of the second column 23. The first attribute 1A1 of the first attribute set is allocated to the first attribute SA1 of the standard attribute set, which stands for the attribute "read", in the first line 24 of the conversion table 21. The second attribute 1A2 of the second attribute set is allocated to the second attribute SA2 of the standard attribute set, which stands for the attribute "unread", in the second line 25 of the conversion table 21. Each of the two first lines 24 & 25 represent a 1:1 allocation.

The third line 26 of the allocation table 21 contains a logical link. Here, the result of the logical AND-link of the third attribute 1A3 and of the fourth attribute 1A4 of the first attribute set is allocated to the attribute SA3 of the standard attribute set. This makes this allocation table 21 only suitable for converting attributes of the first attribute set into attributes of the standard attribute set, which occurs especially when an electronic message is received via the first communication channel. Another allocation table (not shown here) is therefore filed for the conversion into the other direction. When an allocation table contains 1:1 allocations only, a single allocation table per interface module will thus be sufficient.

If no corresponding attribute of the first attribute set exists for an attribute of the standard attribute set and if none can be derived from a logical link with other attributes of the first attribute set, there will be no allocation to this attribute of the standard attribute set and no relevant information can be transmitted or received via the corresponding communication channel. The relevant cell of the second column of the allocation table will therefore remain blank.

Each line of the allocation table 21 thus contains a rule for the allocation of an attribute of the first attribute set and of the standard attribute set.

If one of the users 17 & 20 wishes to transmit an electronic message, he or she can set in the corresponding processing modules 16 & 19, what kind of electronic message he or she wishes to transmit and via which communication channel. If the user wants to inquire, whether new electronic messages have been received, it can also be (pre-)determined which communication channels are to be checked for the arrival of new electronic messages. It is also possible to set a certain period of time, within which the arrival of new electronic messages is to be checked.

If one of the users 17 & 20 looks for a particular electronic message, he or she can set in the corresponding processing modules 16 & 19, via which communication channel(s) (all of them is possible) the message is to be searched for. Message archives (not shown here), where electronic messages have been archived, can be included in the search.

The conversion module 11 can also provide information on request, especially receiving addresses or so-called profile pictures of any of the users 16 & 19. The first user 17 can, as an example, inquire via the first processing module 16 on the conversion module 11 about any further receiving addresses of the second user 20, apart from the one through a known communication channel. If the second user 20 has approved the transmission of this information, the conversion module 11 will pass on this information to the first processing module 16, thus enabling the first user 17 to send an electronic message to the second user 20 via other communication channels. This inquiry about further receiving addresses can also be transmitted via one of the interface modules 12 & 14 to the conversion module 11. This will make it superfluous that the inquiring user accesses the conversion module 11 via an own processing module.

Should a new electronic message for one of the users 17 & 20 be received on one of the external servers 13 & 15, it will be passed on via the corresponding interface module 12 & 14 to the conversion module 11. The latter will then decide, whether the user concerned (17 & 20) will be informed about the arrival of a new electronic message via his or her corresponding processing module 16 & 19. The users 17 & 20 can define rules for such occurrences which are filed and stored in the conversion module 11. These rules can also be modified very easily by the users 17 & 20, so that the behavior of the conversion module 11 can be adapted to the current situation of the users 17 & 20 in a similarly easy manner. It is also possible that the conversion module 11 adapts the rules mentioned above automatically to the relevant behavior of the users 17 & 20.

What is claimed is:

1. A system (10) for processing electronic messages comprising:

a first communication interface module (12) in electronic communication arrangement with a first external server (13) to form a first communication channel via the internet, the first external server (13) configured to transmit a first type of electronic messages to the first communication interface module (12), an electronic message conversion module (11) in operative electronic communication arrangement with the first communication interface module (12), the first communication interface module (12) configured to electronically transmit and receive ft the first type of electronic messages which may have attributes of a first attribute set;

a second communication interface module (14) in electronic communication arrangement with a second external server (15) to form a second communication channel via the internet, the second external server (15) configured to transmit a second type of electronic messages to the second communication interface module (14) and the electronic message conversion module (11), the second communication interface module (14) configured to electronically transmit and receive the second type of electronic messages which may have attributes of a second attribute set;

an electronic message processing module (16, 19) in electronic communication arrangement with the electronic message conversion module (11), the electronic message processing module (16) configured to process for a user (17, 20) electronic messages of a standard message type and, in doing so, configured to allocate attributes of a standard attribute set to the processed electronic messages;

the electronic message conversion module (11) configured to facilitate the conversion of electronic messages between the standard messages type and the first and second messages type and vice versa; wherein, a first allocation table (21) between the standard attribute set and the first attribute set is electronically stored in the first communication interface module (12);

a second allocation table between the standard attribute set and the second attribute set is electronically stored in the communication second interface module (14) and;

the first communication interface module (12) is configured to convert attributes between the first attribute set and the standard attribute set on the basis of the first allocation table;

the second communication interface module (14) is configured to convert attributes between the second attribute set and the standard attribute set on the basis of the second allocation table; and, the electronic message conversion module (11) is configured so that login information which is required by the first communication interface module (12) or the second communication interface module (14) for transmitting and receiving electronic messages can be passed on.

2. The system in accordance with claim 1, characterized in that rules for the conversion referred to above are stored in at least one of the first allocation table (21) and the second allocation table.

3. The system in accordance with claim 1, characterized in that the electronic message processing modules (16, 19) are configured to determine for the process of transmitting an electronic message, from which of the first communication interface module (12) or the second communication interface module (14) the message is to be transmitted.

4. The system in accordance with claim 1 characterized in that the electronic message processing modules (16, 19) are configured so that a search for a certain electronic message can be started from more than one communication interface module (12, 14).

5. The system in accordance with claim 1, characterized in that the electronic message conversion module (11) is configured so that it can provide information to the user (17, 20) on request.

6. The system in accordance with claim 1, further comprising an electronic message identification module (18) which can provide login information to the electronic message conversion module (11).

7. The system in accordance with claim 6, characterized in that the electronic message identification module (18), the electronic message conversion module (11) and at least one of the communication interface modules (12, 14) are configured so that the login information can be transmitted encrypted from the electronic message identification module (18) to the first communication interface module (12) and the second communication interface module (14).

8. The system in accordance with claim 6, characterized in that the electronic message identification module (18) is configured so it can read out the login information from an identification device.

* * * * *